3,277,109
2-AMINO-3a,8b-DIHYDRO-4H-INDENO[2,1-d] OXA-
ZOLE AND ITS ACID ADDITION SALTS
George Ireland Poos, Ambler, and Richard Joseph Mohr-
bacher, Fort Washington, Pa., assignors to McNeil Lab-
oratories, Incorporated, a corporation of Pennsylvania
No Drawing. Filed Jan. 26, 1966, Ser. No. 523,017
1 Claim. (Cl. 260—307)

This invention relates to novel chemical compounds. More particularly, this invention relates to 2-amino-3a,8b-dihydro-4H-indeno[2,1-d]oxazoles which are pharmacologically useful as anorexigenic agents.

The compounds of this invention may be represented by the following structural formula:

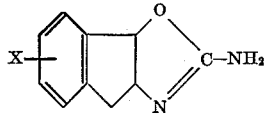

(I)

wherein X is a member selected from the group consisting of hydrogen, halo and trifluoromethyl. The therapeutically useful acid addition salts of Formula I are also included within the scope of this invention.

The subject compounds are prepared by reacting an amino alcohol of Formula II with cyanogen bromide Formula III, preferably in approximately equimolar ratios. The reaction of these materials to effect the desired cyclization is advantageously conducted in a suitable solvent, such as, for example, a lower alkanol, e.g., methanol, ethanol or butanol; an aliphatic hydrocarbon, e.g., pentane, hexane and the like; an aromatic hydrocarbon, e.g., benzene, toluene, xylene and the like; or an ether such as diethyl ether, methylethylether or an ether alcohol such as ethoxyethanol. The cyanogen bromide may be prepared in situ in alcoholic media; for example, by adding sodium cyanide and bromine to the alcoholic solvent in which the reaction is to be carried out. Inclusion of a base in the reaction mixture is generally advantageous. Illustrative bases are alkali and alkaline earth metal hydroxides and carbonates; tertiary amines; salts of alkali and alkaline earth metals with weak organic acids; and the like. Sodium acetate is a preferred salt. The reaction proceeds quite satisfactorily at room temperatures and, in general, temperatures from 0° C. to 40° C. may be employed. The reaction may be illustrated by the following equation:

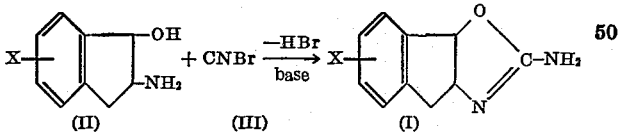

The Compounds I may be converted to their therapeutically useful acid addition salts by reaction with an appropriate acid, such as, for example, an inorganic acid, e.g., hydrochloric, hydrobromic, sulfuric and the like, or an organic acid e.g., acetic, propionic, lactic, oxalic, malonic, maleic, tartaric, citric, benzoic, p-toluenesulfonic, salicylic and the like. The salts are converted to the free bases by conventional techniques, e.g., by reaction with alkali such as sodium or potassium hydroxide.

Due to the structural configuration of the subject compounds, it is evident that their existence in the form of more than one stereoisomer (e.g., the cis and trans forms) is possible. It is intended that all such isomers be included within the scope of this invention.

The following examples are intended to illustrate, but not to limit, the scope of the present invention.

Example I

A 10 g. sample of 2-amino-1-indanol hydrochloride (0.055 mole) is stirred with 17.7 g. (0.216 mole) of sodium acetate in 200 ml. of methanol. The resulting slurry is stirred in an ice bath while a solution of 5.8 g. (0.055 mole) of cyanogen bromide in 140 ml. of methanol is added over a period of 20 min. The slurry is stirred at room temperature for five hours, and then concentrated to dryness in vacuo with the temperature kept below 45° C. The resulting solid is stirred with iced aqueous potassium carbonate and extracted three times with chloroform. The organic extracts are combined, washed with water, then brine, dried over magnesium sulfate and concentrated to a small volume in vacuo. The resulting thick syrup is diluted with ethyl acetate and, upon trituration, crystals are obtained. Two recrystallizations from ethyl acetate give crystals of 2-amino-3a,8b-dihydro-4H-indeno[2,1-d]oxazole; M.P. 166.5–168° C.

Analysis.—Calcd. for $C_{10}H_{10}N_2O$: C, 68.95%; H, 5.79%; N, 16.08%. Found: C, 68.91%; H, 5.87%; N, 16.08%.

The hydrochloride salt of the foregoing oxazole is obtained by treatment with hydrochloric acid.

What is claimed is:

A member selected from the group consisting of 2-amino-3a,8b-dihydro-4H-indeno[2,1-d]oxazole and the therapeutically useful acid addition salts thereof.

No references cited.

ALEX MAZEL, Primary Examiner.

ALTON D. ROLLINS, Assistant Examiner.